Dec. 20, 1949   J. MILLER   2,491,511
PARACHUTE RIP CORD AND RIP CORD HOUSING
Filed Oct. 7, 1948

INVENTOR.
JOSHUA MILLER
BY
M. O. Hayes
ATTORNEY

Patented Dec. 20, 1949

2,491,511

UNITED STATES PATENT OFFICE 2,491,511

PARACHUTE RIP CORD AND RIP CORD HOUSING

Joshua Miller, Drexel Hill, Pa.

Application October 7, 1948, Serial No. 53,326

8 Claims. (Cl. 244—149)

(Granted under the act of March 3, 1883, as amended April 30, 1928; 370 O. G. 757)

This invention relates to improvements in extensible-cable housings, and more particularly pertains to improvements in parachute rip-cord handle assemblies.

Seat-type parachutes employed currently must be provided with two lengths of rip cords and housings therefor, one length being required when a para-raft is included with the parachute and a second and shorter length being required when such para-raft is not included. As freedom of the cable to alter its length while in use is dangerous, predetermined fixed length is secured by passing the cable through a hole in the grip, swaging a metal ball on the inner side, and then securing a metal strip on the outer side. Thus, each length cannot be adjusted, nor can one length be employed in both applications. The disadvantages of the non-interchangeability of the two lengths is obvious: The purchase and stocking of two rip cords and two rip-cord housings for each parachute is required. Under tactical conditions, hazard can be created by the non-availability of one of such lengths. In addition, the rip cord adapted for use with one housing might be paired with the other housing, thereby placing the parachute out of commission.

Such objections are overcome by employment of the novel parachute rip-cord handle assembly disclosed and claimed herein, the subject device providing a single assembly adapted to function efficiently at both rip-cord lengths that are required in use.

The principal object of this invention is to provide a parachute rip-cord handle assembly of simple and durable construction adapted to be used with a parachute alone and with the combined pack of a parachute and a para-raft.

Another object is to provide a parachute rip-cord handle assembly wherein the effective length of the rip cord can be adjusted readily and facilely.

Other objects and many of the attendant advantages of this invention will be readily appreciated as the same becomes better understood by reference to the following detailed description when considered in connection with the accompanying drawing wherein.

Similar numerals refer to similar parts throughout the several views.

Figure 1:
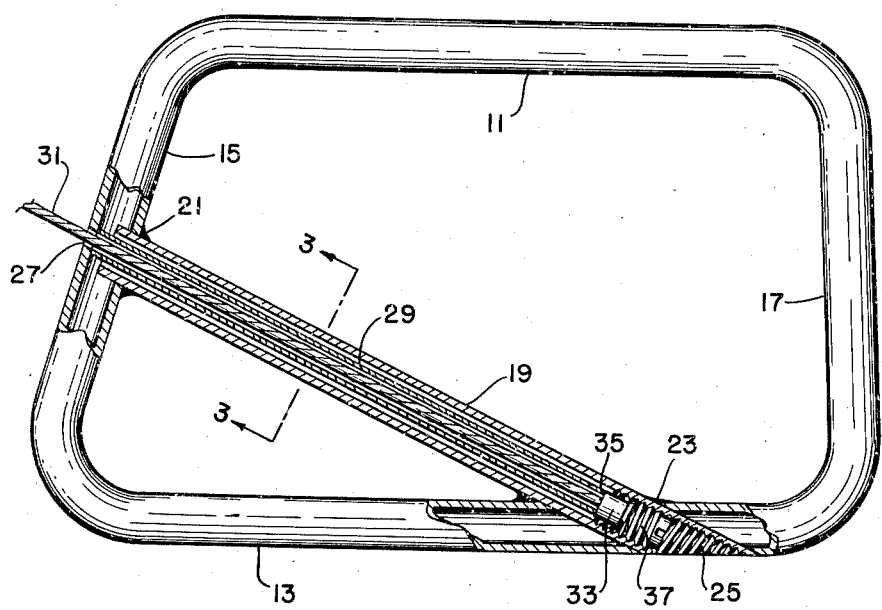
Fig. 1 is a plan view of a parachute rip-cord handle assembly, partly in section, showing a preferred embodiment of the invention in one operative arrangement of the elements thereof.

A trapezoidal-handle-grip tubing comprises short and long parallel portions 11 and 13 respectively, and non-parallel portions 15 and 17. A length of straight tubing 19 extends into a hole bored into non-parallel portion 15 and through a hole bored through long parallel portion 13, said tubing 19 being secured at the diagonal defined by welding 21 and 23, or other suitable means. The end of tubing 19 that is fastened to parallel portion 13 is provided with interior threads 25 to receive the setscrew hereinafter described, and a bore 27 is cut through non-parallel portion 15 coaxially with tubing 19 to permit passage of the rip cord hereinafter described.

Split tube 29, of U-shaped cross section, is adapted to slide in tubing 19. The major transverse dimension of said split tube 29 is greater than the diameter of bore 27. Rip-cord cable 31 is provided with an enlargement or head end-fitting 33 at the end thereof, said head end-fitting 33 forming a shoulder 35 against which split tube 29 can abut. Setscrew 37 is carried in straight tube 19 at threads 25.

When it is desired to use the shorter length of rip cord the elements are assembled in the manner shown in Fig. 1. Cable 31 is extended through straight tube 19 and beyond the threaded portion 25 a distance sufficient to position split tube 29 upon said cable with one end of said split tube 29 bearing against shoulder 35. Cable and split tube 29 are then slid into straight tube 19 until the other end of split tube 29 abuts the inner face of the outer wall of non-parallel portion 15. Setscrew 37 is then threaded into straight tube 19 until said setscrew abuts the head end-fitting 33. When so assembled, movement of the cable 31 relative the handle grip is prevented.

Figure 2:
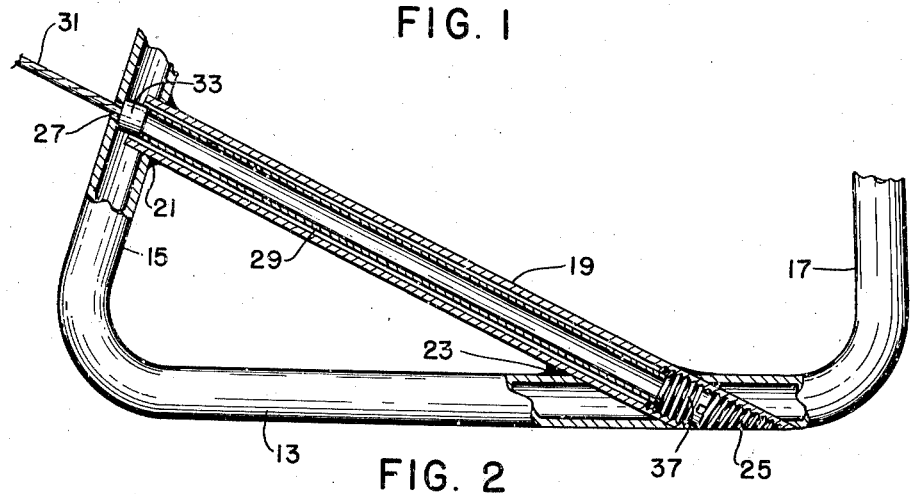
Fig. 2 is a fragmentary plan view of a parachute rip-cord handle assembly, partly in section, showing another operative arrangement of the elements thereof.
Figure 3:
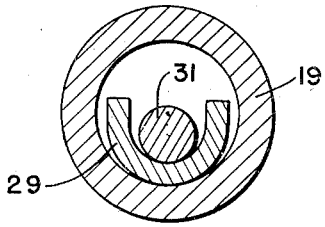
Fig. 3 is a section taken on the line 3—3 of Fig. 1.

When it is desired to use the longer length of rip cord, the elements are assembled in the manner shown in Fig. 2. Cable 31 is pulled relative straight tube 19 until shoulder 35 of head end-fitting 33 abuts the inner face of the outer wall of non-parallel portion 15. Split tube 29 is then slid into straight tube 19 until one end of said split tube abuts head end-fitting 33. Setscrew 37 is then threaded into straight tube 19 until said setscrew abuts the other end of split tube 29. When so assembled, movement of the cable 31 relative the handle grip is prevented.

It is apparent that the parachute rip-cord handle assembly hereinabove described provides a combination of simple construction wherein a rip cord can be secured readily and facilely at each of two different effective lengths.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. A parachute rip-cord handle assembly comprising a tubular grip, a cable carried slidably in said grip, a split tube carried slidably on said cable, said tube being slidable interior said grip, and means to prevent movement of said cable relative said grip and said tube.

2. A parachute rip-cord handle assembly comprising a trapezoidal grip, a tube carried between a non-parallel side and a parallel side of said grip, said grip having bores in alignment with said tube, a cable adapted to lie in and be moved longitudinally of said tube and said bores, means to prevent movement of the end of said cable past one only of said bores, and means to secure said end proximate one of said bores.

3. A parachute rip-cord handle assembly comprising a trapezoidal grip, a tube secured to a non-parallel side and to a parallel side of said grip, said grip having bores in alignment with said tube, a cable adapted to lie in and be moved longitudinally of said tube and said bores, an enlargement on the end of said cable adapted to prevent movement of said cable past one of said bores, and means to secure said enlargement proximate one of said bores.

4. A parachute rip-cord handle assembly comprising a trapezoidal grip, a tube secured to a non-parallel side and to a parallel side of said grip, said grip having bores in alignment with said tube, a cable adapted to lie in and be moved longitudinally of said tube and said bores, an enlargement on the end of said cable adapted to prevent movement of said cable past one of said bores, and means to secure said enlargement proximate either one of said bores.

5. An extensible parachute rip-cord handle assembly comprising a trapezoidal grip, a first passage through a non-parallel side of said grip, a second passage through a parallel side of said grip and aligned with said first passage, a tube between said sides and connecting said passages, a cable adapted to lie in and be moved longitudinally of said passages and tube, an enlargement attached to said cable and adapted to pass through said tube and only one of said passages, and a split tube adapted to be placed around said cable and to be movable through the first-mentioned tube and only one of said passages.

6. An extensible parachute rip-cord handle assembly comprising a trapezoidal tubular grip, a first passage through a non-parallel side of said grip, a second passage through a parallel side of said grip and aligned with said first passage, a tube secured between said sides and connecting said passages, a cable adapted to lie in and be moved longitudinally of said passages and said tube, an enlargement attached to the end of said cable and adapted to pass through said tube and only one of said passages, and a split tube adapted to be placed around said cable and to be movable through the first-mentioned tube and only one of said passages, said split tube also being adapted to abut either face of said enlargement when said split tube and said enlargement are positioned in said first-mentioned tube, and a setscrew threaded into the end of said first-mentioned tube through which said enlargement is adapted to pass.

7. A parachute rip-cord handle assembly comprising a hollow grip, a cable carried slidably in said grip, a split tube carried slidably on said cable, said tube being slidable interior said grip, and means to prevent movement of said cable relative said grip and said tube.

8. A parachute rip-cord handle assembly comprising a grip, a hollow member carried by said grip, a cable adapted to lie in and be moved longitudinally of said hollow member, means to prevent movement of the end of said cable past one end of said hollow member, and means to secure said end of said cable proximate one end of said hollow member.

JOSHUA MILLER.

No references cited.